Nov. 25, 1941.   L. OURUSOFF   2,263,817
TEMPERATURE CONTROL SYSTEM
Filed May 4, 1938
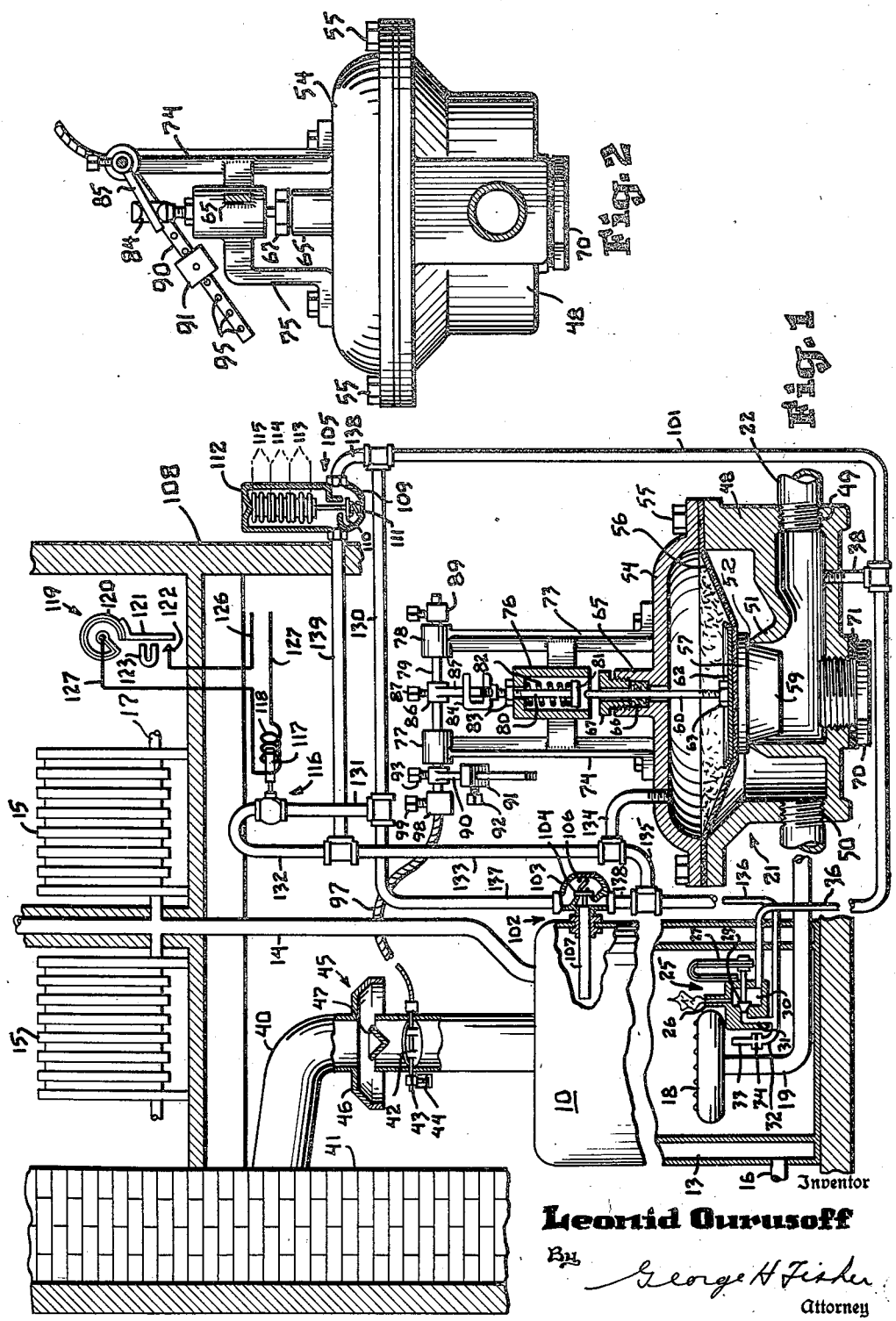
Inventor
Leonid Ourusoff
By
*George H Fisher*
Attorney Patented Nov. 25, 1941

2,263,817

UNITED STATES PATENT OFFICE 2,263,817

TEMPERATURE CONTROL SYSTEM

Leonid Ourusoff, Chevy Chase, Md., assignor to Minneapolis-Honeywell Regulator Company, Minneapolis, Minn., a corporation of Delaware Application May 4, 1938, Serial No. 205,933

11 Claims. (Cl. 236—1)

The present invention relates to a temperature control system and more particularly to one employing an improved pressure motor operated valve for controlling the flow of gas to a gas burner of a heating plant.

In temperature control systems employing gas burning furnaces, it is quite common to use a diaphragm valve for controlling the flow of gas to the burner. Such valves have in the past largely been operated in an on and off manner, however. The modulation of the flow of fuel to any fluid fuel burner is highly desirable, and in view of the particular adaptability of gas to modulation it is extremely desirable that the gas be modulated, if possible. While various attempts have been made to modulate gas valves of the so-called diaphragm type, these attempts have not been wholly successful. The difficulty with these prior valves has largely resided in the fact that they depended upon the inclusion of too many moving parts in the gas chamber itself. As is well known, practically all gas contains a slight amount of gummy matter and it is very easy for these moving parts to stick after continued operation thereof. The problem of modulating is further complicated by the fact that it is necessary that the valve snap open to a certain minimum open position, and similarly in closing that it snap from a certain minimum closed position. This is necessary to avoid what is commonly known as "popback" in the mixer, a condition arising when the flow of gas to the burner is too small.

An object of the present invention is to provide a pressure motor operated valve which is inherently of the snap type in which spring means is employed for terminating the snap movement and causing the valve to modulate over a substantial portion of its range of movement.

A further object of the invention is to provide a pressure motor operated valve which is inherently of the snap type and which has provision for operating an air damper and in which the damper operating means is used to terminate the snap movement and cause the valve to modulate over a substantial portion of its range of movement.

A further object of the present invention is to provide a pressure motor operated valve in which the pressure in the motor and consequently the position of the valve is varied in accordance with outside temperature.

A further object of the invention is to provide a pressure motor operated valve in which the pressure in the motor and consequently the position of the valve is abruptly changed upon the temperature of the heated space reaching a predetermined value and in which the position of the valve is modulated in accordance with outside temperature.

A further object of the present invention is to provide an arrangement according to the preceding object in which the position of the valve is further modulated in accordance with boiler temperature.

A further object of the present invention is to provide a control device having a fluid filled actuating device in which a plurality of fills of different temperature of vaporization are employed.

Other objects of the present invention will be apparent from the accompanying specification, claims and drawing, in which Figure 1 is a schematic view of the improved temperature control system, and in which Figure 2 is an elevational view of the diaphragm valve viewed from the right of Figure 1.

Referring to Figure 1, a gas burning hot water furnace is generally indicated by the reference numeral 10. This furnace contains the usual boiler portion 13 which is normally filled with water. Conducting the water from the boiler is a pipe 14 which leads to radiators 15, only two of which are shown. The water from the radiators is returned to the boiler through branch pipes 17 to a pipe 16, only a small portion of which pipes are shown. Located within the lower portion of the furnace is a gas burner 18 to which gas is supplied through a pipe 19. The pipe 19 is connected to the outlet of a diaphragm valve, generally indicated by the reference numeral 21, and the inlet of which is connected to a pipe 22 leading from a suitable source of gas (not shown). Located adjacent to the main burner 18 is a pilot burner and control valve structure 25. This structure comprises a pilot burner 26 adjacent which extends a U-shaped bimetallic element 27. This bimetallic element is exposed to the pilot flame and is, in turn, connected to a valve 29 adapted to control communication between a valve chamber 30 and a passage 31. Passage 31 is connected with a pipe 32 leading to an auxiliary burner 33. A restriction 34 is interposed in the connection between pipe 32 and the auxiliary burner 33 for a purpose to be hereinafter discussed. Gas is supplied to the valve chamber 30 by a pipe 36, which pipe is connected through a second pipe 38 to the inlet chamber of valve 21.

A stack 40 serves to convey the products of combustion to a chimney 41. Interposed in the stack is a stack damper 42. The stack damper is secured to a rod 43 pivotally mounted in the stack and extending therethrough. The stack damper is biased to open position by means of a weighted arm 44 secured to the rod 43. A down draft diverter 45 is used in connection with the stack. This down draft diverter is of conventional construction and comprises a downwardly extending flared hood 46 and a deflector 47 secured to the lower section of the stack pipe. The deflector 47, as indicated in the drawing, is conical in shape with the pointed portion of the cone extending downwardly. The deflector 47 acts to divert any down draft and prevent the same from interfering with proper combustion conditions in the furnace. The gases deflected are forced out in the space between the upper end of the lower section of stack 40 and the hood 46.

The valve 21 comprises a valve casing 48 which is provided with an inlet opening 49 and an outlet opening 50. Valve casing 48 is further provided with the usual transverse partition wall 51 which is apertured to form a valve seat 52. An upper casing member 54 is secured to the valve casing member 48 by cap screws 55 or other suitable fastening means. Secured between the casing members 54 and 48 is a diaphragm 56 which constitutes the movable wall of a pressure motor. The diaphragm 56 has secured thereto a valve disc 57 to which is secured a frusto-conical throttling skirt 59. A threaded rod 60 is secured to the valve disc 57 and extends through the diaphragm 56 and through a backing plate 62 on the other side of the diaphragm 56. A nut 63 or suitable fastening means is employed for securing the backing plate 62, the diaphragm 56 and the valve disc 57 in assembled relation. The upper casing member 54 is provided with a boss 65 in which is located packing material 66 held in position by a gland nut 67. The rod 60 extends through the packing 66 and the gland nut 67 and the packing 66 serves to prevent escape of gas around the rod 60 as the rod is moved back and forth. In the lowermost portion of valve casing member 48, a screw plug 70 is secured. This plug 70 is flanged and interposed between the flange of plug 70 and the casing 48 is a gasket 71. The plug 70 is for the purpose of providing convenient access to the interior of the valve casing.

Secured to the top of the upper casing member 54 are three vertically extending members 73, 74 and 75. These three members cooperate to support a recessed guide member 76 which is integral therewith. The member 75 terminates at a point adjacent this guide member 76 as indicated in Figure 2. The members 73 and 74 extend up to a higher point and terminate in journals 77 and 78. Located within the journals 77 and 78 is a shaft 79. The guide member 76 serves to support a rod 80 having a flanged head 81 at its lowermost end. A spring 82 is located between the upper wall of the recess of the guide member 76 and the flanged head 81 and serves to bias rod 80 downwardly. This downward movement is limited by a nut 83 in threaded engagement with rod 80. Secured to the uppermost end of rod 80 is a U-shaped yoke 84 which is adapted to cooperate with an arm 85 rigidly secured to the shaft 79 by means of a collar 86 and a set screw 87 extending through the collar. The arm 85 extends between the two prongs of the U-shaped yoke so that a pivotal connection is formed between the arm 85 and the rod 80. The two arms of the yoke 84 are rounded on their surfaces facing the arm 85, as best indicated in Figure 2, for the purpose of facilitating the pivotal movement of the arm 85 with respect to yoke 84. A collar 89 is secured to the outermost end of shaft 79 to limit its movement in one direction and adjacent the other end thereof is secured an arm 90 having a weight 91 adjustably mounted thereon. The weight 91 is held in any selected position by means of a set screw 92. As indicated in Figure 2, a series of apertures 95 are provided in the arm 90 for receiving the set screw 92. The position of arm 90 with respect to shaft 79 is fixed by means of a set screw 93 engaging the shaft 79.

A flexible cable 97 has one end secured to the rod 43 on which the stack damper is mounted and has its other end secured to the shaft 79 by means of a collar 98 and a set screw 99. It will be evident that any rotation of shaft 79 causes a similar rotation of the damper 42. Rotation of shaft 79 is effected by the rod 60 engaging the flanged head 81 of rod 80, moving the same upwardly, rotating the rod 85 and consequently the shaft 79. Upon downward movement of the diaphragm, the spring 82 serves to rotate the rod 79 in the other direction. The nut 83 on the rod 80 is so adjusted that the spring 82 is not able to move rod 80 downwardly into engagement with rod 60 when the valve disc 57 is on its seat. In other words, in the closed position of the valve, as shown, a slight amount of lost motion exists between rod 60 and the flanged head 81 of rod 80.

For the purpose of better understanding the structural arrangement to be presently described, it may be noted here that the diaphragm valve is of the so-called indirect acting type in which pressure is conveyed from one side to the other side of the diaphragm by means of parallel passages in each of which is a controlling valve. As any of these valves are opened, the pressure on the upper side of the diaphragm is increased and the valve is moved towards closed position. For the purpose of permitting the escape of the gas from the upper side of the diaphragm, a constant bleed is provided. In order to simplify the description of the apparatus, reference will only be made at the present time to the controllers and not to the pipes connecting them, the reference to the pipes being deferred until the description of the operation of the system.

Associated with the furnace 10 is a throttling control valve 102. This control valve assembly comprises a valve housing 103 in which is located a valve 104 biased to closed position by a spring 106. Secured to the valve 104 is a rod and tube thermostat 107 which extends into the boiler portion of the furnace and is exposed to the temperature of the heated water. The rod and tube thermostat is so connected to valve 104 that as the temperature rises, the valve 104 is moved towards open position.

Located exteriorly of the building, the outermost wall of which is indicated by the reference numeral 108, is a second throttling control valve 105. This valve likewise comprises a valve body 109 having a valve 110 biased to closed position by a spring 111. The temperature responsive element of the present throttling valve consists of a temperature responsive element 112 of the bellows type, which element has three separate sections. These sections are indicated by lines drawn to the points of juncture and to the ends of the element, the sections being indicated by the numerals 113, 114, and 115. Each of these sections contains a limited amount of vaporizable fluid. The fluid in each section has a different temperature of vaporization and is so selected that it is completely vaporized before the next section begins to exert appreciable vapor pressure. As is well known, the use of an ordinary volatile fluid element is limited in that the temperature range over which a straight line characteristic may be obtained between the temperature and the pressure developed is limited. For this reason, such a device is not entirely satisfactory for use out of doors where the temperature range is, of necessity, extremely wide. By using three separate sections, however, each with a fill having a straight line characteristic over a certain portion and by having these fills limited so that they successively become completely vaporized, it is possible to obtain a relatively straight line operation over an extremely wide temperature range. It is to be understood that when such a liquid becomes completely vaporized, the rise in pressure thereafter is solely due to the expansion by reason of change in temperature and not to the change in vapor pressure. The expansion by reason of change in temperature is relatively small and does not seriously disturb the control by the other elements.

A solenoid valve is generally indicated by the reference numeral 116. This valve comprises a solenoid core 117 and a solenoid winding 118. It is to be understood that the valve 116 is biased to open position and is moved to closed position by energization of the winding 118. A thermostat 119 controls the energization of winding 118. This thermostat comprises a bimetallic element 120 to which is secured a contact arm 121. The contact arm is adapted to move into and out of engagement with a fixed contact 122. A magnet 123 is located adjacent to the contact arm 121 for the purpose of imparting a snap action movement to the arm 121, as is well known in the art.

As previously explained, bimetallic element 27 of the device 25 is exposed to the flame from the pilot burner 26 and is designed to actuate the valve 29. This valve 29 is normally closed so long as pilot burner 26 is lighted. Upon the pilot burner being extinguished, however, the bimetallic element 27 is cooled off and is so disposed that, when it is cooled off, it moves the valve 29 towards open position, establishing communication between valve chamber 30 and the passage 31.

*Operation*

The various elements of the system are shown in the position they occupy when the room thermostat 119 is satisfied, that is, subjected to a temperature above that for which it is set to maintain, the outdoor throttling valve 105 is in an intermediate open position, and the boiler water throttling valve 102 is in a closed position indicating that the boiler water temperature is relatively cold. Under these conditions, the valve 116 is open by reason of the deenergization of winding 118. Passage is thus established for the gas from the inlet side of the valve to the interior of the upper casing 54 as follows: through pipes 38, 101, 130, and 131, valve 116, pipes 132, 133, and 134 to the upper side of the valve casing 54. While gas is being allowed at this time to bleed out through pipes 134, 135, and 136, restriction 34, and auxiliary burner 33, the flow of gas through the latter passage, by reason of the restriction 34, is so much smaller than that flowing into the upper casing 54 through the gas circuit just traced that the pressure on the top side of the diaphragm is sufficient to hold the diaphragm and valve assembly in closed position. Let it be assumed that the temperature to which thermostat 119 is subjected drops to the point where contact arm 121 is moved into engagement with contact 122. The solenoid winding 118 will then be energized as follows: conductor 126 leading from a suitable source of power (not shown), contact 122, contact arm 121, bimetallic element 120, conductor 127, solenoid winding 118, and conductor 127' leading back to said source of power. The energization of solenoid winding 118 results in valve 116 being moved to closed position.

The connection between the inlet side of the valve and the upper casing member 54, previously traced, is now interrupted. The only passage for gas between the inlet of valve 21 and the upper casing member 54 is the following one: through pipes 38, 101, and 138, valve 105, and pipes 139, 133, and 134 to the upper casing member. While this passage permits the flow of some gas to the upper chamber, a sufficient amount of gas passing through this last named passage is bled off to the burner 33 that the pressure above the diaphragm begins to drop. After the pressure has dropped to the value at which the total pressure above the diaphragm is slightly less than the total effect of the inlet pressure on the under side of the valve disc 57, the valve disc 57 is lifted off of its seat. As soon as the valve disc 57 moves away from its seat even slightly, the effective area underneath the diaphragm is immediately increased with the result that the diaphragm and valve is snapped upwardly without any further change in pressure above the diaphragm. If there was no restraining means, the diaphragm would undoubtedly snap to nearly completely open position. While this is desirable with an on and off valve, it is not desirable with a valve which it is intended to modulate. With such a valve, while a snap movement is necessary, this snap movement should terminate at the point where the flow of gas is sufficient to initially support combustion. The lost motion between the flanged head 81 of rod 80 and the rod 60 is for the purpose of permitting a limited amount of snap movement. As soon, however, as rod 60 engages the flanged head 81, further movement of the diaphragm valve assembly upwardly is impeded by reason of spring 82 which serves to offer a progressively increasing resistance towards further movement of the valve. In view of the fact that all of the other control valves are closed, the position at which the diaphragm 56 will finally stop its movement will be determined by the position of the outdoor temperature responsive valve 105. This valve is sufficiently closed under normal circumstances that the opening movement of the valve will be greater than that resulting from the snap opening and the valve 57 will accordingly move upwardly against the constantly increasing force exerted by spring 82. At a certain point, an equilibrium condition will be reached at which the gas admitted through valve 105 minus the gas escaping through the auxiliary burner 33 exerts just sufficient pressure on the diaphragm 56 that further upward movement thereof is prevented. Thereafter as the throttling valve 105 opens further, the pressure above diaphragm 56 will increase and the valve member 57 will be moved towards closed position. On the other hand, when valve 105 moves towards closed position as a result of the outside temperature dropping, the pressure above the diaphragm will be decreased and the valve will go even further towards open position.

The admission of gas through valve 21 by the opening of the valve in the manner just described causes gas to be admitted to the main burner 18 which gas is ignited by the pilot burner 26. The ignition of the main burner causes the contents of the boiler 13 to rise in temperature with the result that the throttling valve 102 begins to open. As this valve begins to open, a second path is provided for the flow of gas to the upper chamber as follows: through pipes 38, 101, 130, and 137, valve 102, pipes 138, 135, and 134 to the interior of the upper casing member 54. This additional supply of gas will result in the pressure above the diaphragm 56 being increased with the result that the main valve 57 is moved further towards closed position. As the rise in boiler water temperature continues, the main valve 57 will be moved further and further towards closed position. If it should happen that before the thermostat 119 is satisfied, the main valve should reach the minimum open position at which rod 66 is no longer in engagement with head 81, any further change in pressure will cause a snap closing of the valve by the diaphragm 56. This arises by reason of the fact that at this point the valve 57 is so close to the seat 50 that the pressure on the outlet side between the partition 51 and the outer walls of the casing begins to drop. This reduction in outlet pressure decreases the total pressure on the underside of the diaphragm, which in turn lowers the diaphragm still further. This action is thus accelerated so that the valve is moved towards closed position with a snap action. In this manner, it is assured that the valve both opens and closes for a short distance of its movement with a snap action to avoid any "pop-back."

During the modulating period of the diaphragm valve, the stack damper 42 is also modulated. This results in the draft through the stack being maintained in the correct proportion for the fuel being burned. This modulation of the stack damper is highly desirable since it greatly increases the efficiency of combustion. It is to be understood that the damper is never moved to entirely closed position so that some draft is available when the diaphragm first snaps to its minimum open position and has not moved rod 80 and consequently shaft 79 appreciably. In the event that at any time the flexible cable 97 becomes broken or disconnected, the weighted arm 44 is effective to move the stack damper to open position. This is desirable since the safe position of the stack damper is the open position, and if the burner were operated with the stack damper in closed position an excessive amount of carbon monoxide would be generated with the possibility of serious injuries to occupants of the building being heated. By reason of the weighted arm 44, any danger of this is eliminated. The weighted arm 90 is for the purpose of counterbalancing the weighted arm 44. These two arms are so adjusted that the operation of the damper so long as the flexible cable is operating properly is not affected by the presence of either of the two weighted arms.

It will further be noted that the means for operating the stack damper also constitutes the means for converting a portion of the snap movement of the valve into a modulating movement. By reason of the spring 82, as previously explained, it is necessary to increase the pressure after the rod 60 has engaged the flanged head 81 of rod 80. Without such continuously changing impedance means as is offered by the spring 82, the position of the valve 57 would be extremely unstable and would be determined largely by the resistance offered to movement by the diaphragm 56. By reason, however, of the spring 82 of the stack damper operating means, the positions assumed by the diaphragm valve are very stable. The modulating action is further improved by the throttling skirt 59 which serves to graduate the flow in a much more accurate manner than could be done with valve 57. The valve 57 thus acts primarily as a shut-off valve while the throttling skirt 59 acts as the throttling or modulating means.

It is, of course, understood that at any time that the thermostat 119 is satisfied, the solenoid valve is deenergized and valve 116 is moved to the open position to establish a condition described in connection with the first portion of the operation. Under these conditions, the diaphragm 56 is held in valve closed position regardless of the positions of any of the other control valves. The room thermostat thus acts as a room limit control to insure that the room temperature never becomes excessive. Under normal conditions, by reason of the fact that the position taken by the valve is a function of both the boiler temperature and the outdoor temperature, the room thermostat will operate only occasionally. It will be understood that with the exception of abnormal changes of the heat loss, the outdoor temperature condition and the boiler water temperature condition determine the amount of heat necessary to supply the heating system. Thus with the apparatus properly adjusted, the gas will be supplied to the burner 18 for long periods at an intermediate rate which is just sufficient to maintain the proper temperature in the spaces being heated.

If, at any time, the pilot burner 26 would be extinguished, it is assured that the diaphragm valve will be closed. As soon as the pilot burner 26 is extinguished, the bimetal element 27 cools off and moves valve 29 to open position. This results in the following passage being established to the inlet of the upper casing member 54: through pipes 38 and 36, valve chamber 30, passage 31, and pipes 136, 135, and 134 to the interior of the upper casing member 54. The establishment of this passage results in gas being supplied to the upper side of the diaphragm so much faster than it can escape through the orifice 34 that the valve 57 is moved to closed position.

It will be seen that I have devised a temperature control system wherein it is possible to obtain an extremely constant flow of heat to the space being heated and the exact amount necessary to maintain the temperature at the desired value, regardless of the changes in heat loss due to outside temperature. Furthermore, it will be seen that this is accomplished with a pressure motor operated valve of the modulating snap action type which is extremely simple and which is relatively free of moving parts exposed to gas. It will further be seen that I have devised for use in connection with this system a fluid filled temperature responsive device having an extremely wide range of straight line operation.

While I have shown a specific embodiment of this invention, it is to be understood that this is for purposes of illustration only and that my invention is limited only by the scope of the appended claims.

I claim as my invention:

1. In a device of the class described, a pressure motor having a movable wall, a valve connected to said movable wall and operated thereby, means for gradually varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, and spring means operative to permit a predetermined amount of free movement of said wall and said valve in opening direction and beyond the range of said free movement to offer progressively increasing resistance toward further movement of said wall to limit the movement of said wall to a position corresponding to the pressure on said wall.

2. In a device of the class described, a pressure motor having a movable wall, a valve connected to said movable wall and operated thereby, means for gradually varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, throttling means also connected to said movable wall, and spring means operative to permit a predetermined amount of free movement of said wall and said valve in opening direction and beyond the range of said free movement to offer progressively increasing resistance toward further movement of said wall to limit the movement of said wall to a position corresponding to the pressure on said wall so that the flow of fluid is modulated by said throttling means.

3. In a device of the class described, a pressure motor having a movable wall, a valve connected to said movable wall and operated thereby, means for gradually varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, spring means, and means associated with said movable wall acting to engage said spring means only after a predetermined amount of movement of the wall and valve has taken place whereby said spring means is operative to terminate the snap movement of the valve after said predetermined amount of movement has taken place and thereafter to offer progressively increasing resistance towards further movement of said wall to limit the movement of said wall to a position corresponding to the pressure on said wall.

4. In a device of the class described, a pressure motor having a movable wall, a valve connected to said movable wall and operated thereby, means for gradually varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, throttling means also connected to said movable wall, and spring means operable after a predetermined snap movement of said wall and valve in opening direction to offer progressively increasing resistance toward further movement of said wall to limit the movement of said wall to a position corresponding to the pressure on said wall so that the flow of fluid is modulated by said throttling means.

5. In a device of the class described, a pressure motor having a movable wall, a valve connected to said movable wall and operated thereby, means for gradually varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, throttling means also connected to said movable wall, spring means, and means associated with said movable wall acting to engage said spring means only after a predetermined amount of movement of the wall and valve has taken place whereby said spring means is operative to terminate the snap movement of the valve after said predetermined amount of movement has taken place and thereafter to offer progressively increasing resistance towards further movement of said wall.

6. In a device of the class described, a pressure motor having a movable wall, a valve connected to said movable wall and operated thereby, means for varying the relative pressures on opposite sides of said wall to move said valve to and from closed position, said valve being of sufficient size and so disposed with respect to the path of fluid flow that the change in the pressure differential on opposite sides thereof in opening is effective to cause a quick movement thereof towards open position, damper actuating means including an operating member therefor, and means associated with said movable wall acting to engage said operating member after a predetermined amount of movement of said wall and valve has taken place whereby said damper operating means is effective to terminate the snap movement of the valve to limit the further movement of the valve in accordance with the pressure on the wall.

7. In a temperature control system for an enclosed space, temperature changing means, a valve controlling the flow of a temperature changing fluid to said temperature changing means, a pressure motor for operating said valve and utilizing the fluid being valved as the pressure fluid, means comprising a device responsive to a temperature outside of said space for controlling the pressure of said valved fluid in said pressure motor to cause the pressure motor to variably position the valve in accordance with the value of said outside temperature, and means responsive to the temperature of said space operative when said space temperature reaches a predetermined value to change the pressure in said pressure motor relatively quickly to cause said valve to move directly to closed position.

8. In a temperature control system for an enclosed space, means including a fluid fuel burner for heating a heat conducting fluid, means for circulating said fluid fuel in heat transferring relation with the space, a valve controlling the flow of fuel to said burner, a pressure motor for operating said valve and utilizing the fluid fuel being valved as the pressure fluid, means comprising a device responsive to a temperature outside of said space and a device responsive to the temperature of the heated fluid for controlling the pressure of said valved fluid fuel in the pressure motor to cause the pressure motor to variably position the valve and thereby modulate the fuel in accordance with the value of said outside temperature and said heated fluid temperature, and means responsive to the temperature of said space operative when said space temperature reaches a predetermined value to change the pressure in said pressure motor relatively quickly to cause said value to move directly to closed position.

9. In combination, a furnace comprising a fluid fuel burner, a stack for said furnace, a damper in said stack, a valve controlling the flow of fuel to said burner, a pressure motor connected to said valve for operating the same, means for varying the relative pressures on opposite sides of said wall to move said valve to and from closed position, said valve being of sufficient size and so disposed with respect to the path of fluid flow that the change in pressure differential on opposite sides thereof in opening is effective to cause a quick movement thereof towards open position, means for moving said damper towards open position as said movable wall is moved towards valve open position, said means comprising an element in the path of said wall but spaced therefrom when said valve is closed whereby said damper moving means is effective to limit the snap movement of said valve and to cause the further movement of the wall and valve to be modulating in character.

10. In combination, a furnace comprising a fluid fuel burner, a draft controlling damper for said furnace, a valve controlling the flow of fuel to said burner, a pressure motor connected to said valve for operating the same, means for varying the relative pressures on opposite sides of said wall to move said valve to and from closed position, said valve being of sufficient size and so disposed with respect to the path of fluid flow that the change in pressure differential on opposite sides thereof in opening is effective to cause a quick movement thereof towards open position, means for moving said damper towards open position as said movable wall is moved towards valve open position, said means comprising an element in the path of said wall but spaced therefrom when said valve is closed whereby said damper moving means is effective to limit the snap movement of said valve and to cause the further movement of the wall and valve to be modulating in character.

11. In a temperature control system, a fuel burning furnace comprising a fuel burner and a draft damper secured to a rotatable shaft, a valve controlling the flow of fuel to said burner, motor means for positioning said valve, a shaft rotated thereby as an incident to operation of said valve, a flexible shaft connecting the rotatable shaft positioned by said motor means with the rotatable shaft to which said damper is secured, means biasing said motor means to a position in which said damper and valve are closed, and means associated with said damper exerting a biasing force opposite to but less than that exerted by said previously named biasing means whereby said damper is moved to open position in the event of a failure of said rotatable shaft.

LEONID OURUSOFF.